(12) United States Patent
Ikeda (10) Patent No.: US 8,708,036 B2
(45) Date of Patent: Apr. 29, 2014

(54) HEAT EXCHANGER FOR COOLING HIGH-TEMPERATURE GAS (75) Inventor: Tooru Ikeda, Kariya (JP)

(73) Assignee: Denso Corporation, Kariya (JP)

( * ) Notice: Subject to any disclaimer, the term of this patent is extended or adjusted under 35 U.S.C. 154(b) by 909 days.

(21) Appl. No.: 12/802,869

(22) Filed: Jun. 16, 2010

(65) Prior Publication Data
US 2010/0319889 A1 Dec. 23, 2010

(30) Foreign Application Priority Data
Jun. 17, 2009 (JP) ................. 2009-144489

(51) Int. Cl.
F28D 7/10 (2006.01)
F28F 9/02 (2006.01)

(52) U.S. Cl.
USPC .......................... 165/157; 165/162

(58) Field of Classification Search
CPC .............. F28F 9/0221; F28F 9/0224
USPC ................ 165/157, 162, 175, 176
See application file for complete search history.

(56) References Cited

U.S. PATENT DOCUMENTS

| | | | | |
|---|---|---|---|---|
| 6,269,870 | B1 * | 8/2001 | Banzhaf et al. | 165/158 |
| 6,595,274 | B2 * | 7/2003 | Hayashi et al. | 165/158 |
| 7,195,060 | B2 * | 3/2007 | Martin et al. | 165/157 |
| 8,002,022 | B2 * | 8/2011 | Geskes | 165/157 |
| 2005/0067153 | A1 * | 3/2005 | Wu et al. | 165/158 |
| 2007/0193732 | A1 | 8/2007 | Oofune et al. | |
| 2008/0011464 | A1 | 1/2008 | Oofune et al. | |
| 2008/0164014 | A1 | 7/2008 | Nakamura | |
| 2010/0071871 | A1 * | 3/2010 | Gaensler et al. | 165/51 |

FOREIGN PATENT DOCUMENTS

| | | |
|---|---|---|
| JP | 2000-54916 | 2/2000 |
| JP | 2000-73879 | 3/2000 |
| JP | 2002-137054 | 5/2002 |
| JP | 2006-207887 | 8/2006 |
| JP | 2007-51576 | 3/2007 |
| JP | 2007-225190 | 9/2007 |
| JP | 2007-232230 | 9/2007 |
| JP | 2007-232355 | 9/2007 |
| JP | 2008-039380 | 2/2008 |
| JP | 2009-019580 | 1/2009 |
| JP | 2009-058144 | 3/2009 |
| WO | WO2006/102736 | 10/2006 |

OTHER PUBLICATIONS

Office Action issued Oct. 16, 2012 in corresponding Japanese Application No. 2009-144489 with English translation.

* cited by examiner

Primary Examiner — Tho V Duong
(74) Attorney, Agent, or Firm — Harness, Dickey & Pierce, PLC (57) ABSTRACT A heat exchanger for cooling high-temperature gas includes a gas tank portion into which the high-temperature gas is supplied through an inlet port of the gas tank portion, a plurality of tubes configured such that the high-temperature gas flowing from the gas tank portion passes therethrough, and a cooling-medium tank portion covering each of the tubes with a gap defined therebetween. Each of the tubes has an expansion portion located at a side of the inlet port. A cooling medium flows in the gap on an outer peripheral surface of the tube. The gas tank portion, the cooling-medium tank portion, and the expansion portion of the tube are stacked such that a partition portion between the gas tank portion and the cooling-medium tank portion has a thickness larger than a thickness of the gas tank portion or the cooling-medium tank portion.

6 Claims, 7 Drawing Sheets

HEAT EXCHANGER FOR COOLING HIGH-TEMPERATURE GAS

CROSS REFERENCE TO RELATED APPLICATION

The present application is based on Japanese Patent Application No. 2009-144489 filed on Jun. 17, 2009, the disclosure of which is incorporated herein by reference.

FIELD OF THE INVENTION

The present invention relates to a heat exchanger for cooling high-temperature gas, in which high-temperature gas is cooled by using a cooling medium such as water. It is preferable that the present invention is applied to a heat exchanger for exhaust gas recirculation (EGR), which is hereinafter referred to as an EGR heat exchanger, having a structure without a header plate, i.e., a header-plate-less structure.

BACKGROUND OF THE INVENTION

For example, JP-A-2002-137054, JP-A-2000-54916, and JP-A-2007-51576 disclose a conventional EGR heat exchanger. In the conventional EGR heat exchanger, both ends of a tube, which is used as an EGR gas passage, in a flowing direction penetrate and are connected to header plates (also referred to as tube sheets), and exhaust gas and a cooling medium are separated from each other by the header plates. The EGR heat exchanger of JP-A-2007-51576 has a structure having a header plate (a side surface of a case) formed integrally with a gas tank portion and a water tank portion.

Further, JP-A-2007-225190, JP-A-2007-232355 corresponding to US 2007/0193732, and JP-A-2007-232330 disclose a heat exchanger in which exhaust gas and a cooling medium are separated from each other by stacking and joining tubes, a part of each of which is expanded, without using a header plate.

The heat exchanger of JP-A-2007-225190 has a header-plate-less structure configured by stacking tubes, end portions of which are expanded, and a gas tank portion and a water tank portion, which are integrally formed, are attached to the stacked tubes. However, a portion at which thermal strain may be generated has only a thickness corresponding to one plate.

The heat exchanger of JP-A-2007-232355 has a header-plate-less structure configured by stacking tubes, a part of each of which is expanded, and a gas tank and a water tank are attached to the stacked tubes. However, a portion at which thermal strain may be generated has only a thickness corresponding to one plate.

According to JP-A-2007-232330, in a joint portion between a gas tank and a water tank, the water tank is overlapped with the gas tank at one side surface among four side surface. However, the other three side surfaces do not have an overlapping structure that facilitates heat transfer.

Further, JP-A-2006-207887 corresponding to US 2008/0164014 discloses a heat exchanger with a particular slit block having a comb-like shape. According to JP-A-2006-207887, in a joint portion between a gas tank and a water tank, the gas tank is overlapped with the water tank on inner peripheral surfaces thereof at two side surfaces among four side surfaces. However, the structure of the heat exchanger becomes complicated, and each of the other two side surfaces has a thickness equal to a thickness corresponding to one plate.

As described in JP-A-2002-137054, JP-A-2000-54916, and JP-A-2007-51576, the heat exchanger with the header plate or an equivalent thereof has a complicated structure. Thus, a structure without a header plate or an equivalent thereof is desired. The problem can be solved by stacking tubes, end portions of which are expanded, to be the header-plate-less structure.

Figure 12:
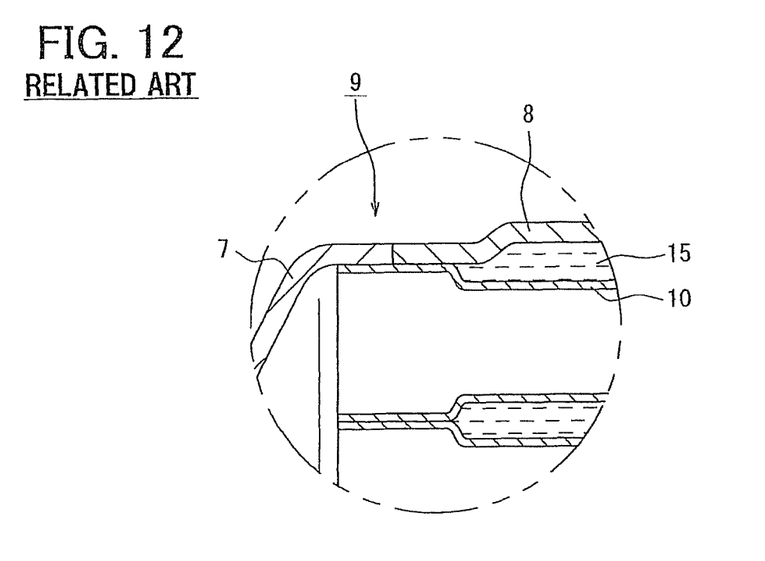
FIG. 12 is a cross-sectional view showing a partition portion, which is manufactured based on related arts.

FIG. 12 shows a previously proposed heat exchanger, which is formed in view of JP-A-2007-225190, JP-A-2007-232355, and JP-A-2007-232330. In the heat exchanger shown in FIG. 12, a joint portion 9 (also referred to as a partition portion) is formed between a gas tank portion 7 which directly contacts exhaust gas and a water tank portion 8 which contacts LLC (coolant). In the joint portion 9, an end surface of the gas tank portion 7 is abutted on an end surface of the water tank portion 8 and the gas tank portion 7 and the water tank portion 8 are brazed in a T-shape.

It is assumed that high-temperature gas which can be up to 900° C. flows into the gas tank portion 7 of the EGR heat exchanger. The high-temperature gas in the gas tank portion 7 is heat-exchanged with a cooling medium at a temperature of approximately 100° C. in the water tank portion 8. Therefore, a temperature difference of approximately 200° C./10 mm is locally generated at the joint portion 9 between the high-temperature gas (high-temperature portion) and the cooling medium (low-temperature portion). Thermal strain is generated due to the temperature difference. If the thermal strain becomes excessive, a member configuring a flow passage is cracked and the fault of fluid leakage may be caused. It is required that such a crack can be prevented not only at one side surface but at least at four side surfaces, i.e., along an entire periphery of the joint portion 9.

SUMMARY OF THE INVENTION

In view of the above-described points, it is an object of the present invention to provide a heat exchanger for cooling high-temperature gas with high reliability. In the heat exchanger, thermal strain generated at a partition portion between a high-temperature portion and a low-temperature portion is decreased along an entire periphery of the partition portion.

The disclosures of the above-described patent documents as related arts can be introduced and incorporated herein by reference.

According to one aspect of the present invention, a heat exchanger for cooling high-temperature gas includes a gas tank portion into which the high-temperature gas is supplied through an inlet port of the gas tank portion; a plurality of tubes configured such that the high-temperature gas flowing from the gas tank portion passes therethrough, each of the tubes having an expansion portion located at a side of the inlet port; and a cooling-medium tank portion covering each of the tubes with a gap defined therebetween, the cooling-medium tank portion being configured such that a cooling medium flows in the gap on an outer peripheral surface of the tube. The tubes are stacked and the expansion portions of the tubes are joined each other so that high-temperature gas passages in the tubes and the gap as a cooling medium passage are separated. A partition portion between the gas tank portion and the cooling-medium tank portion has a thickness larger than a thickness of the gas tank portion or the cooling-medium tank portion.

According to the configuration, a local temperature difference generated in the partition portion can be decreased, a crack of the gas tank portion or the cooling-medium tank portion which configures a flow passage can be prevented, and the fault of fluid leakage can be prevented.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
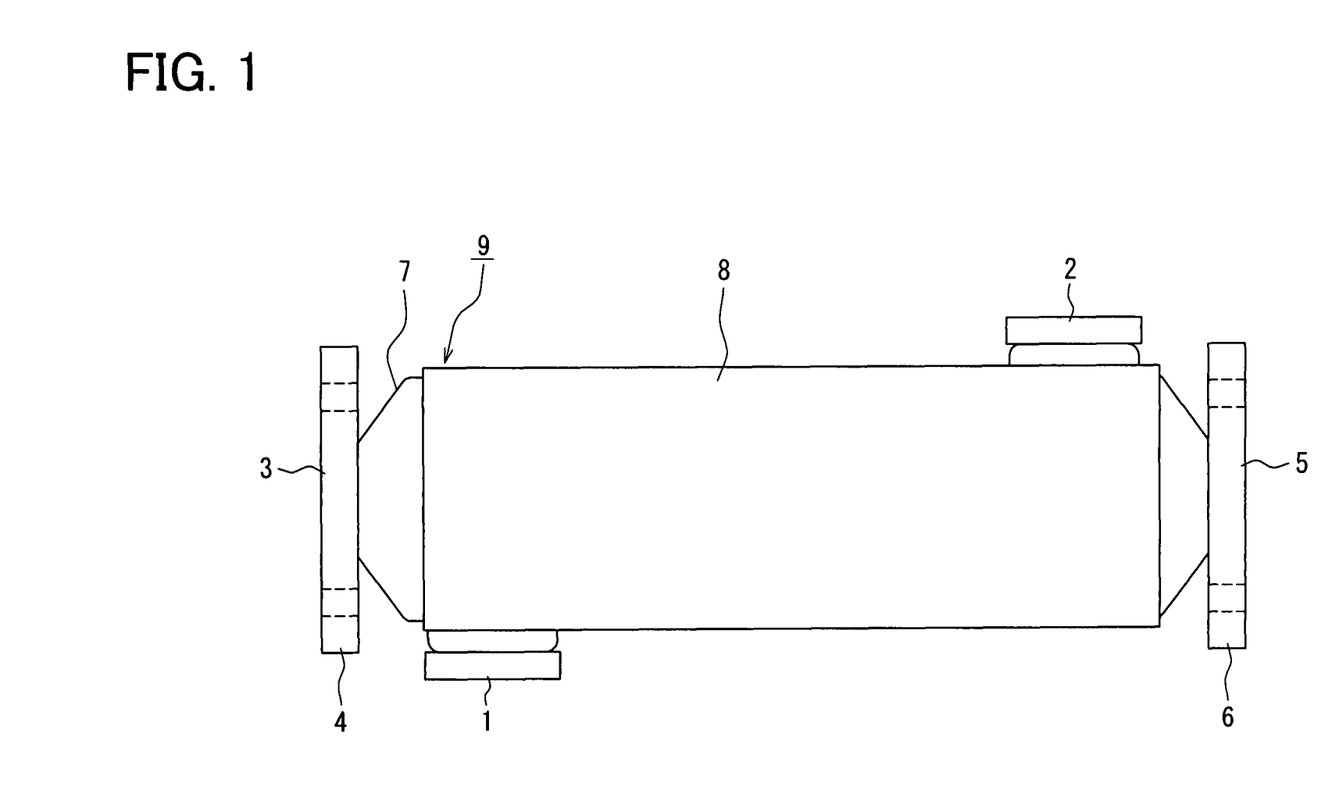
FIG. 1 is an outline view showing an EGR heat exchanger according to a first embodiment of the present invention.

Hereafter, a first embodiment of the present invention will be described with reference to FIGS. 1 to 8. FIG. 1 is an outline view showing an EGR heat exchanger as a heat exchanger for cooling high-temperature gas of the present embodiment. In FIG. 1, the reference numeral 1 indicates an inlet port of water which serves as a cooling medium. A coolant at approximately 90° C. flows from the inlet port 1.

The reference numeral 2 indicates an outlet port of water. The reference numeral 3 indicates an inlet port of high-temperature exhaust gas, and an inlet-side flange 4 is attached to the periphery of the inlet port 3. The reference numeral 5 indicates an outlet port of high-temperature exhaust gas, and an outlet-side flange 6 is attached to the periphery of the outlet port 5. The reference numerals 7 and 8 indicate a gas tank portion and a cooling-medium tank portion (hereinafter, also referred to as a water tank portion), respectively.

A joint portion 9 (also referred to as a partition portion) is formed between the gas tank portion 7 which directly contacts the exhaust gas, and the water tank portion 8 which contacts the water.

Figure 2:
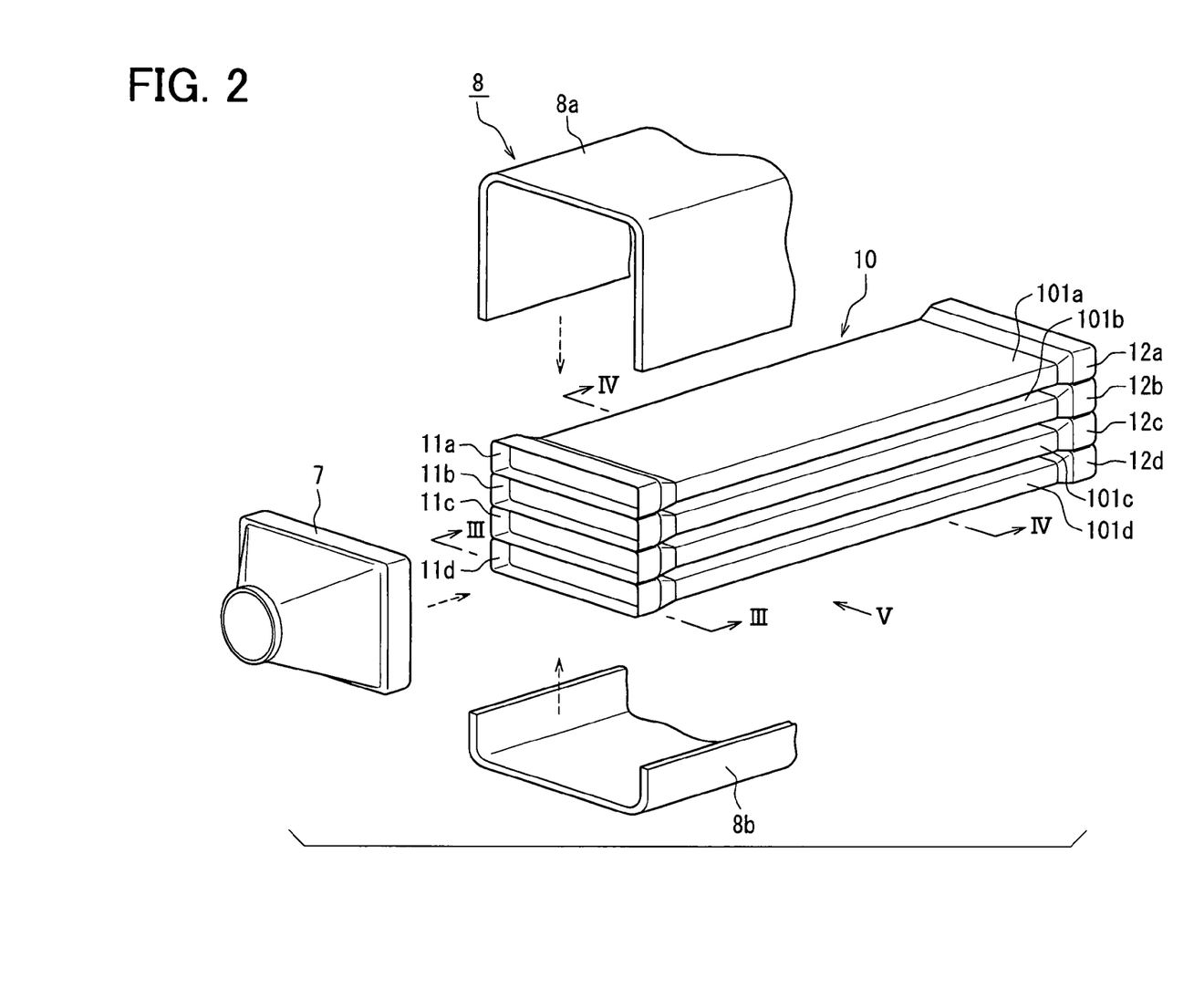
FIG. 2 is an exploded perspective view, showing the EGR heat exchanger according to the first embodiment of the present invention.

FIG. 2 is an exploded perspective view showing the EGR heat exchanger of the present embodiment. The inlet-side flange 4 and the outlet-side flange 6 of FIG. 1 are not shown in FIG. 2.

In FIG. 2, each of multiply-stacked tubes 10 (quadruple stack in the case of FIG. 2) is formed by crimping a metal plate having a thickness of 0.4 mm to become a C-shape. The tubes 10 include four tubes 10a, 10b, 10c, 10d in the present embodiment.

Each of the tubes 10 has expansion portions 11, 12 at both ends thereof so that the heat exchanger has the header-plate-less structure. As shown in FIG. 2, for example, in the case of the tube 10a, expansion portions 11a, 12a are located at both ends of the tube 10a, and a middle portion other than the expansion portions 11a, 12a is indicated by the reference numeral 101a. Each of the tubes 10b, 10c, 10d has the similar configuration to the tube 10a. Although not shown, a well-known fin is placed in each of the tubes 10.

The water tank portion 8 is constructed of an upper water tank portion 8a and a lower water tank portion 8b. After the tubes 10 are stacked, the gas tank portions 7 are put on the expansion portions 11, 12 of the tubes 10, respectively. Next, the upper water tank portion 8a and the lower water tank portion 8b are put on the stacked tubes 10 to be overlapped with the gas tank portions 7.

Figure 3:
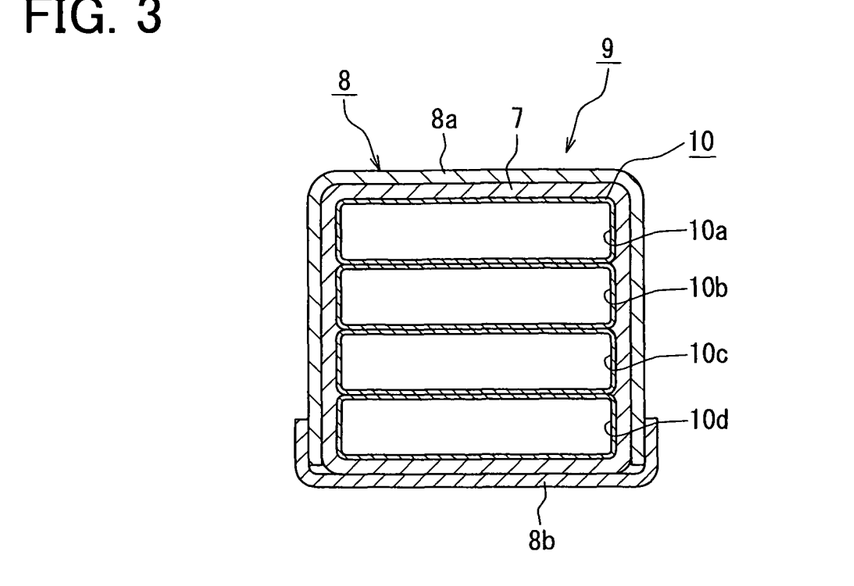
FIG. 3 is a cross-sectional view taken along line III-III of FIG. 2 according to the first embodiment of the present invention.

FIG. 3 is a cross-sectional view taken along line III-III of FIG. 2 of the present embodiment. FIG. 3 shows the cross section of the joint portion (partition portion) 9 between the gas tank portion 7 and the water tank portion 8 of FIG. 2. The water tank portion 8, which is constructed of the upper water tank portion 8a and the lower water tank portion 8b, is placed as the outermost layer of the portion shown in FIG. 3, and the gas tank portion 7 is placed inside the water tank portion 8.

As shown in FIG. 3, the tubes 10 used as passages of the high-temperature exhaust gas are stacked inside the gas tank portion 7. Although the tubes 10 are quadruply stacked in the present embodiment, the number of tubes 10 to be stacked can be arbitrarily set. As is clear from FIG. 3, the water tank portion 8, the gas tank portion 7, and the tube 10 are stacked along the entire periphery of the partition portion 9 including four side surfaces of the water tank portion 8 having a rectangular cross section.

Figure 4:
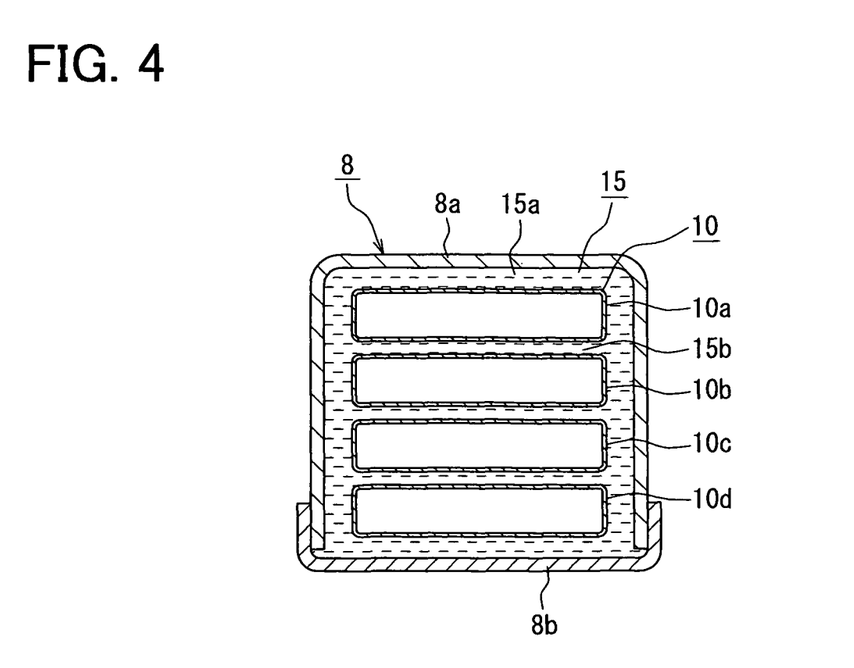
FIG. 4 is a cross-sectional view taken along line IV-IV of FIG. 2 according to the first embodiment of the present invention.

FIG. 4 is a cross-sectional view taken along line IV-IV of FIG. 2 of the present embodiment. The water tank portion 8, which is constructed of the upper water tank portion 8a and the lower water tank portion 8b, is placed as the outermost layer of the portion shown in FIG. 4, and the tubes 10 used as the passages of the high-temperature exhaust gas are stacked inside the water tank portion 8. The tubes 10 are stacked such that adjacent tubes 10 are placed via a gap 15. The gap 15 configures a passage of the coolant (cooling medium). The gap 15 includes a gap 15a which surrounds the outer peripheral surface of the tubes 10, and a gap 15b which is sandwiched between the adjacent tubes 10.

Figure 5:
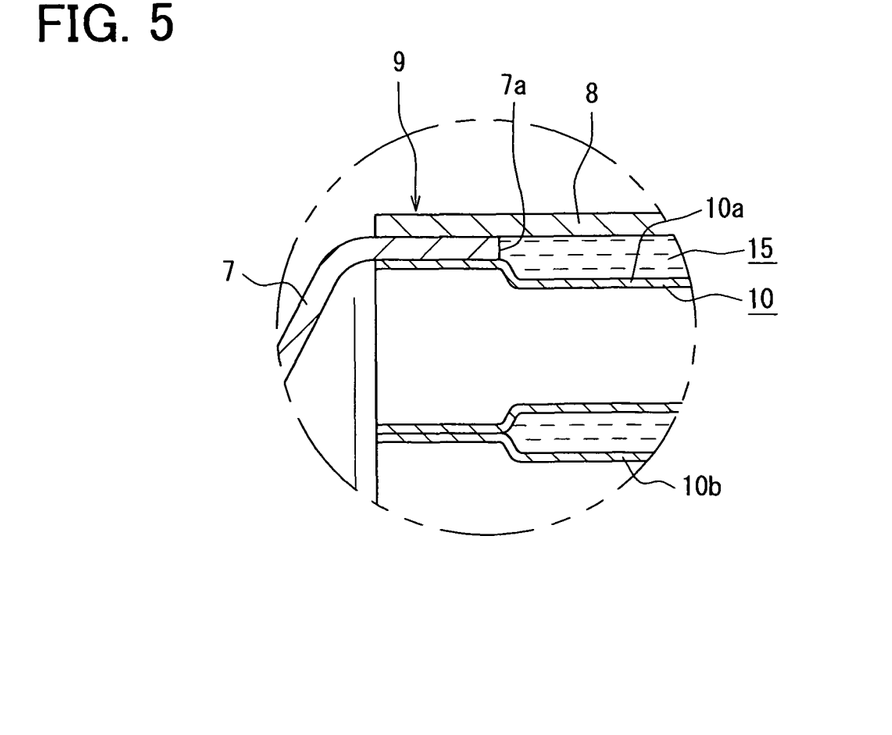
FIG. 5 is a cross-sectional view showing a partition portion according to the first embodiment of the present invention.

FIG. 5 is a cross-sectional view showing the partition portion 9 viewed from a direction shown by the arrow V of FIG. 2. As described above, in the partition portion 9, the water tank portion 8, the gas tank portion 7, and the expansion portion 11 of the tube 10 are stacked and are brazed each other. As shown in FIG. 5, a portion in which the water tank portion 8, the gas tank portion 7, and the expansion portion 11 are stacked is located at the end of the tube 10.

As is clear from FIG. 5, an end portion of the water tank portion 8 is overlapped with an end portion of the gas tank portion 7, and an end surface 7a of the gas tank portion 7 contacts the water as the cooling medium filled in the gap 15.

Since the end surface 7a of the gas tank portion 7 contacts the water, the high-temperature gas tank portion 7 can be efficiently cooled.

Figure 6:
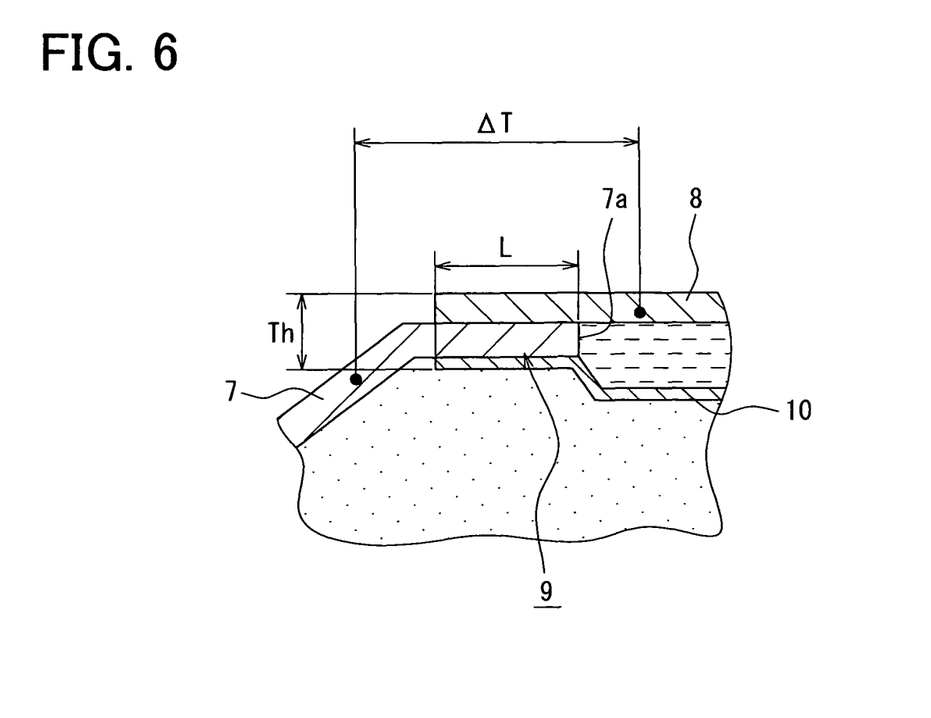
FIG. 6 is a schematic view showing the partition portion according to the first embodiment of the present invention.

FIG. 6 is a schematic view showing the partition portion 9 of the first embodiment. Distribution of a surface temperature exists on the surface of the gas tank portion 7 and the water tank portion 8. That is, a low-temperature side surface and a high-temperature side surface are formed with the partition portion 9 interposed therebetween. ΔT indicates a temperature difference between the low-temperature side surface and the high-temperature side surface.

Since the low-temperature side surface contacts the water as the cooling medium, the low-temperature side surface is maintained at a constant temperature of approximately 100° C. The surface temperature of the high-temperature side surface is determined by heat transfer to a side of the water and heat conduction from the high-temperature gas. If heat quantity from the high-temperature gas is constant, in order to decrease the surface temperature of the high-temperature side surface, it becomes important to facilitate the heat transfer to the side of the water. Thus, the inventor noted that thermal resistance is reduced by thickening a thickness of metal material of a heat transfer portion, i.e., the partition portion 9 for facilitating the heat, transfer.

In order to reduce the thermal resistance, in the heat exchanger having the header-plate-less structure, the gas tank portion 7, the water tank portion 8, and the tube 10 are stacked to have a thick structure at the partition portion 9. Moreover, since thermal strain is generated along the entire periphery outside a core including the gas tank portion 7 and the water tank portion 8, the partition portion 9 is formed to have the thick structure along the entire periphery.

As is clear from FIG. 6, the end surface 7a of the gas tank portion 7 as a high-temperature member directly contacts the water as the cooling medium. Therefore, the gas tank portion 7 as the high-temperature member is rapidly cooled.

In the structure having the header plate described in JP-A-2000-54916, a header plate portion can be thickened by the header plate. However, the gas tank portion as the high-temperature member does not directly contact the cooling medium with the header plate interposed therebetween, and thereby the heat transfer from the gas tank portion to the cooling medium may be deteriorated. However, the gas tank portion 7 directly contacts the water in the present embodiment, and thereby the above-described problem can be solved.

In FIG. 6, the gas tank portion 7, the water tank portion 8, and the tube 10 are stacked and joined each other. However, the partition portion 9 may be configured as follows. The gas tank portion 7 and the water tank portion 8 are formed by forging integrally and continuously using the same metal material, and a thickness of a portion corresponding to an overlapping portion (a thickness of the partition portion 9) is thickened. Here, the overlapping portion indicates a portion in which the gas tank portion 7, the water tank portion 8, and the tube 10 are stacked. The thickness of the integrally-formed portion (the thickness of the partition portion 9) is equal to a thickness Th of the overlapping portion shown in FIG. 6. A length of the partition portion 9 needs to be 5 mm or more.

In both cases, that is, when the gas tank portion 7 and the water tank portion 8 are stacked and when the gas tank portion 7 and the water tank portion 8 are integrally formed by forging or the like to be thick, it is preferable that the partition portion 9 is formed to have a thickness more than twice a thickness of the gas tank portion 7 or the water tank portion 8 along the entire periphery thereof. Therefore, in the partition portion 9 having the thickness more than twice the thickness of the gas tank portion 7 or the water tank portion 8, the sufficient heat transfer is performed, and the local temperature difference generated in the partition portion 9 can be decreased.

In the partition portion 9 of the first embodiment, the thickness of the gas tank portion 7 is 1 mm, the thickness of the water tank portion 8 is 1 mm, and the thickness of the tube 10 is 0.4 mm. The thickness Th of the overlapping portion, that is, the thickness obtained by stacking the gas tank portion 7, the water tank portion 8, and the tube 10, is 2.4 mm. A length L of the overlapping portion is 5 mm.

Figure 7:
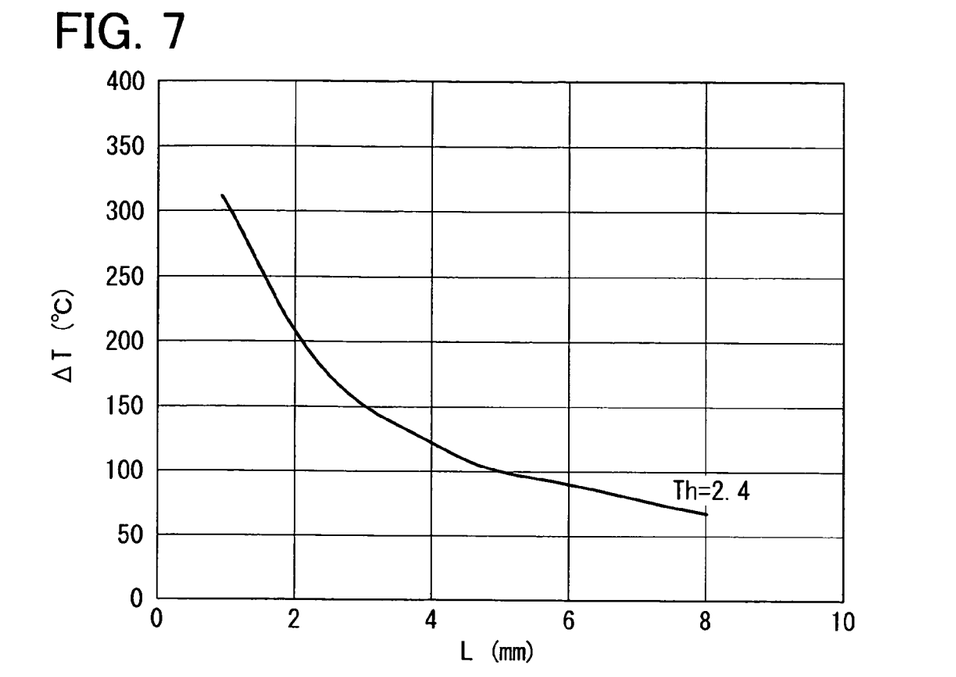
FIG. 7 is a graph showing a relation between a length of an overlapping portion and a temperature difference in the partition portion of FIG. 6.

FIG. 7 is a graph showing a relation between the length L of the overlapping portion and the temperature difference ΔT in the configuration of FIG. 6 when the thickness Th of the overlapping portion is 2.4 mm. The temperature difference ΔT decreases at an accelerated rate as the length L of the overlapping portion becomes large. When the length L of the overlapping portion is over approximately 8 mm (eight times of the thickness of the gas tank portion 7 or the water tank portion 8), the decreasing of the temperature difference ΔT slows down. As shown in FIG. 7, it is preferable that the length L of the overlapping portion is between 2 mm to 8 mm.

Figure 8:
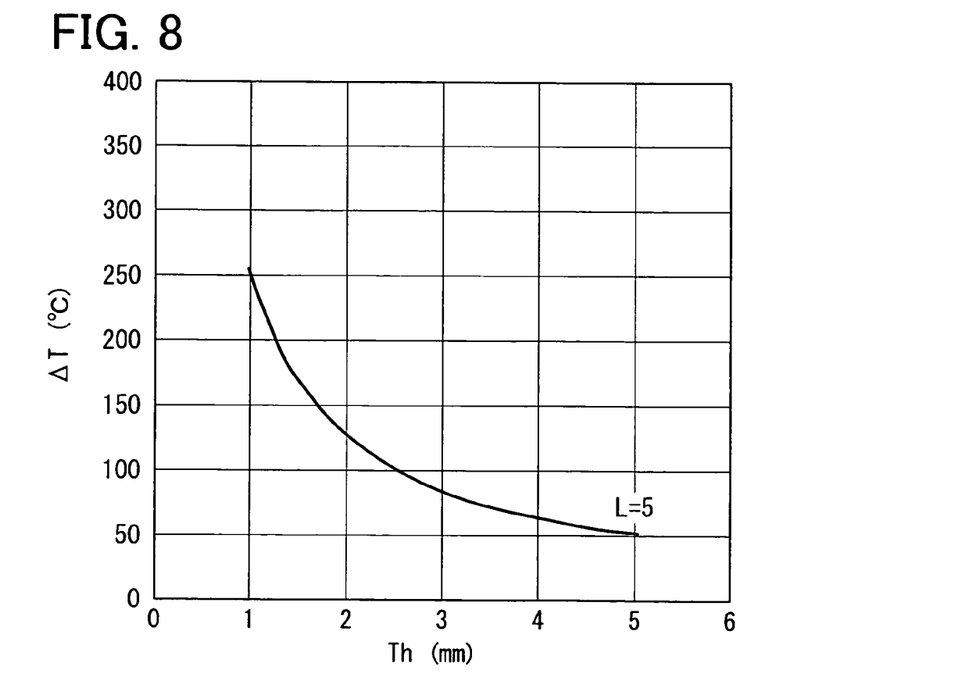
FIG. 8 is a graph showing a relation between a thickness of the overlapping portion and the temperature difference in the partition portion of FIG. 6.

FIG. 8 is a graph showing a relation between the thickness Th of the overlapping portion and the temperature difference ΔT in the configuration of FIG. 6 when the length L of the overlapping portion is 5 mm. The temperature difference ΔT decreases at an accelerated rate as the thickness Th of the overlapping portion becomes large. When the thickness Th of the overlapping portion is over approximately 4 mm (four times of the thickness of the gas tank portion 7 or the water tank portion 8), the decreasing of the temperature difference ΔT slows down. As shown in FIG. 8, it is preferable that the thickness Th of the overlapping portion is between 2 mm to 4 mm.

Therefore, it is preferable that the length L of the overlapping portion is between 2 mm to 8 mm and the thickness Th of the overlapping portion is between 2 mm to 4 mm. If the preferable length and thickness of the overlapping portion are expressed with an aspect ratio of length/thickness, it is preferable that the aspect ratio of length/thickness at the partition portion 9 having the thickness more than twice the thickness of the gas tank portion 7 or the water tank portion 8 is in the range of 2 to 8/2 to 4. In the above-described range of the aspect ratio, the local temperature difference ΔT generated in the partition portion 9 can be decreased, and the thickness of the overlapping portion is thickened to the extent that the decreasing of the temperature difference ΔT slows down. Thus, the local temperature difference generated in the partition portion 9 can be decreased, while saving material.

Accordingly, in the first embodiment, in order to decrease the local temperature difference, the thickness between the gas tank portion 7 which directly contacts the exhaust gas and the water tank portion 8 which contacts the coolant is thickened, and thereby the thermal resistance can be reduced and a temperature gradient can be alleviated. By alleviating the local temperature gradient, thermal stress of the heat exchanger for cooling a high-temperature fluid can be reduced, and the heat exchanger can be designed compactly.

(Second Embodiment)

Figure 9:
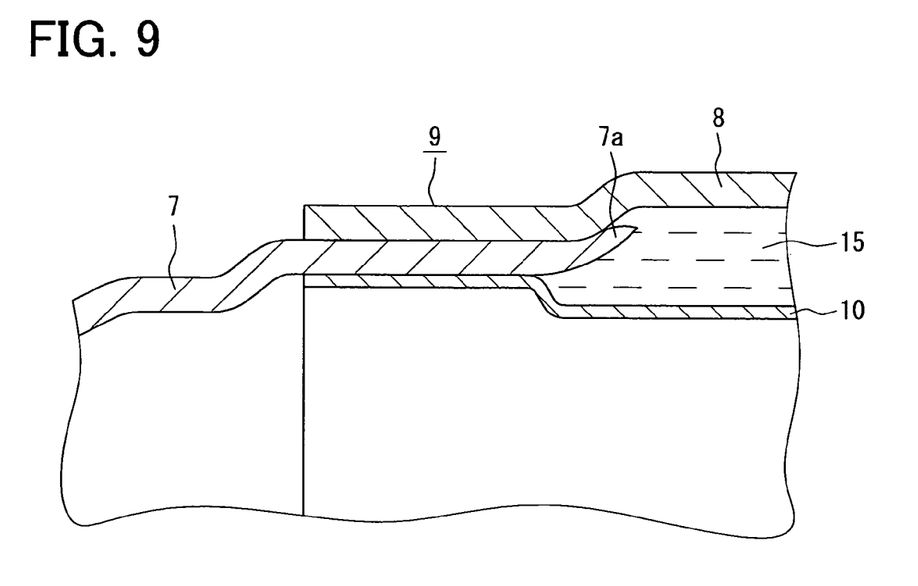
FIG. 9 is a cross-sectional view showing a partition portion according to a second embodiment of the present invention.

Next, a second embodiment of the present invention will be described. FIG. 9 is a cross-sectional view showing a partition portion according to the second embodiment of the present invention. In the following embodiments, similar components to those in the first embodiment are indicated by the same reference numerals, and descriptions thereof will not be repeated. In the following embodiments, different configurations from those in the first embodiment will be described.

As with the first embodiment, the joint portion 9 is formed by stacking the gas tank portion 7, the water tank portion 8, and the tube 10, as shown in FIG. 9. An end portion of the gas tank portion 7 is projected to a side of the cooling medium in the gap 15 to form a projecting portion 7a. Since the gas tank portion 7 can be efficiently cooled by forming the projecting portion 7a, an alleviation effect of the temperature gradient can be increased.

(Third Embodiment)

Figure 10:
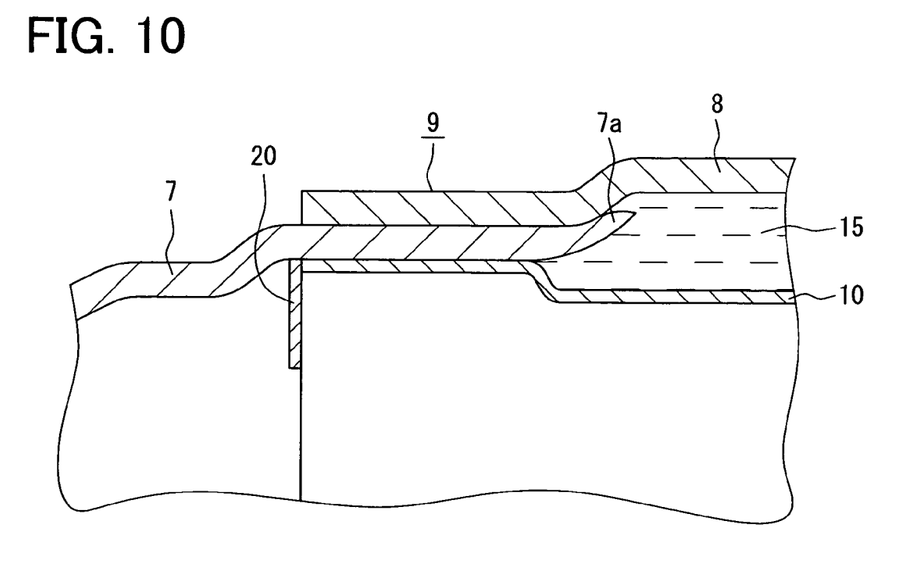
FIG. 10 is a cross-sectional view showing a partition portion according to a third embodiment of the present invention.

Next, a third embodiment of the present invention will be described. FIG. 10 is a cross-sectional view showing a partition portion according to the third embodiment of the present invention. In the present embodiment, different configurations from those in the above-described embodiments will be described. In the third embodiment, as shown in FIG. 10, a baffle 20 is further placed at a side of the gas tank portion 7 of the joint portion 9 so that the high-temperature gas is not blown directly toward the joint portion 9. By placing the baffle 20, a flow rate of a part of the high-temperature gas is decreased, and the temperature gradient of the joint portion 9 is alleviated.

(Fourth Embodiment)

Figure 11A:
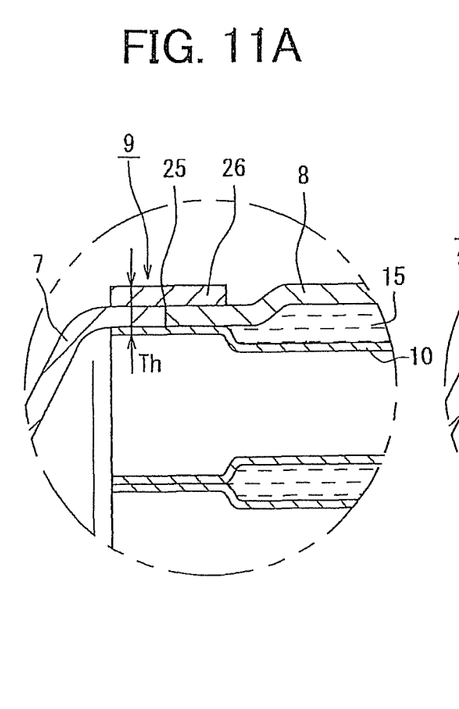
FIG. 11A is a cross-sectional view showing a partition portion according to a fourth embodiment of the present invention.

Next, a fourth embodiment of the present invention will be described. FIG. 11A is a cross-sectional view showing a partition portion according to the fourth embodiment of the present invention. In the present embodiment, different configurations from those in the above-described embodiments will be described. In the fourth embodiment, an end surface of the gas tank portion 7 (having a thickness of 1 mm) is abutted on an end surface of the water tank portion 8 (having a thickness of 1 mm) at an abutting portion 25, as shown in FIG. 11A. The tube (having a thickness of 0.4 mm) is stacked under the abutting portion 25, i.e., on an inner peripheral surface of the abutting portion 25. Further, a circular plate 26 having a length of 5 mm in a lateral direction of FIG. 11 and a thickness of 1 mm is joined to the outer peripheral surface of the abutting portion 25. In this manner, the partition portion 9, in which the thickness Th of the overlapping portion is 2.4 mm, is configured.

Figure 11B:
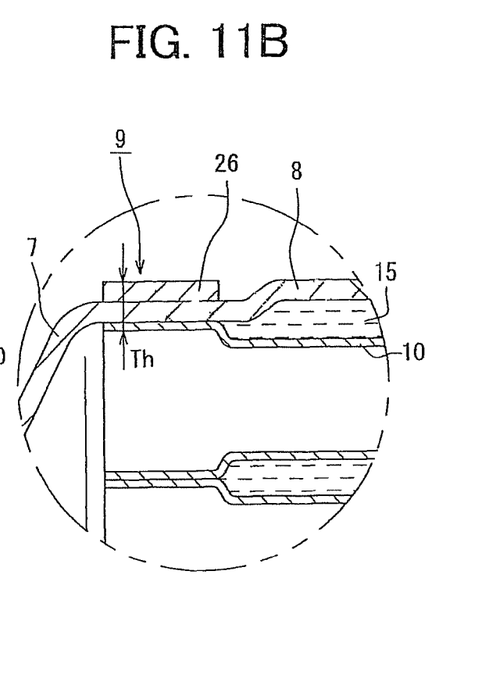
FIG. 11B is a cross-sectional view showing a partition portion according to a modified example of the fourth embodiment.

As a modified example of the fourth embodiment, the partition portion 9 may be configured as follows. As illustrated in FIG. 11B, the gas tank portion 7 (having a thickness of 1 mm) and the water tank portion 8 are formed continuously and integrally using the same material, and the tube 10 is stacked on the inner peripheral surface of a portion corresponding to the abutting portion between the gas tank portion 7 and the water tank portion 8. Further, the circular plate 26 having a length of 5 mm in the lateral direction and a thickness of 1 mm is joined to the outer peripheral surface of the portion corresponding to the abutting portion. In this manner, the partition portion 9 having the thickness Th of 2.4 mm and the length L of 5 mm is configured.

(Other Embodiments)

The present invention is not limited only to the above-described embodiments, and can be modified or extended as follows. For example, in the first embodiment, the present invention is applied to the EGR heat exchanger. However, the present invention can also be applied to another heat exchanger, for example, an exhaust heat recovery device that recovers heat energy from exhaust gas as a heat exchanger for a vehicle.

Moreover, in FIG. 2, the problem is that the temperature difference between the gas tank portion 7, which is adjacent to the expansion portions 11 of the tubes 10 at a side of the inlet port of high-temperature gas, and the cooling-medium tank portion 8 is generated in the partition portion 9.

Therefore, as long as a portion having a thickness larger than that of the gas tank portion 7 or the cooling-medium tank portion 8 is formed along the entire periphery of the partition portion 9 at the side of the inlet port of high-temperature gas, the periphery of the expansion portions 12 at a side of the outlet port of high-temperature gas may have a structure similar to the conventional structure.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A heat exchanger for cooling high-temperature gas, comprising:
   a gas tank portion into which the high-temperature gas is supplied through an inlet port of the gas tank portion;
   a plurality of tubes configured such that the high-temperature gas flowing from the gas tank portion passes therethrough, each of the tubes having an expansion portion located at a side of the inlet port; and
   a cooling-medium tank portion covering each of the tubes with a gap defined therebetween, the cooling-medium tank portion being configured such that a cooling medium flows in the gap on an outer peripheral surface of the plurality of tubes, wherein
   the tubes are stacked and the expansion portions of the tubes are joined each other so that high-temperature gas passages in the tubes and the gap as a cooling medium passage are separated,
   a partition portion between the gas tank portion and the cooling-medium tank portion has a thickness larger than a thickness of the gas tank portion or the cooling-medium tank portion; and
   a circular plate, wherein:
   the gas tank portion is connected to the cooling-medium tank portion at a connecting portion; and
   the tube is stacked on an inner peripheral surface of the connecting portion and the circular plate is joined to an outer peripheral surface of the connecting portion.

2. The heat exchanger according to claim 1, wherein the partition portion is a joint portion in which the gas tank portion, the cooling-medium tank portion, and the expansion portion of the tube are stacked.

3. The heat exchanger according to claim 1, wherein the partition portion has a thickness more than twice a thickness of the gas tank portion or the cooling-medium tank portion.

4. The heat exchanger according to claim 3, wherein an aspect ratio of length/thickness at the partition portion having the thickness more than twice the thickness of the gas tank portion or the cooling-medium tank portion is in a range of (2 to 8) / (2 to 4).

5. The heat exchanger according to claim 1, wherein the connection of the gas tank portion to the cooling-medium tank portion includes abutment of an end surface of the gas tank portion on an end surface of the cooling-medium tank portion at an abutting portion, and the tube is stacked on an inner peripheral surface of the abutting portion and the circular plate is joined to an outer peripheral surface of the abutting portion.

6. The heat exchanger according to claim 1, wherein the connection of the gas tank portion to the cooling-medium tank portion includes continuous and integral formation of the gas tank portion and the cooling-medium tank portion by the same material, and the tube is stacked on an inner peripheral surface of a part of the integrated gas tank portion and the cooling-medium tank portion and the circular plate is joined to an outer peripheral surface of the part of the integrated gas tank portion and the cooling-medium tank portion.

* * * * *